(12) United States Patent
Sato

(10) Patent No.: US 12,309,338 B2
(45) Date of Patent: May 20, 2025

(54) CONTROL DEVICE, NON-TRANSITORY COMPUTER-READABLE RECORDING MEDIUM STORING COMPUTER-READABLE INSTRUCTIONS FOR CONTROL DEVICE, AND METHOD EXECUTED BY CONTROL DEVICE DISPLAYING SERVICE NOTIFICATION

(71) Applicant: BROTHER KOGYO KABUSHIKI KAISHA, Nagoya (JP)

(72) Inventor: Hirokazu Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/355,333

(22) Filed: Jul. 19, 2023

(65) Prior Publication Data
US 2024/0040053 A1    Feb. 1, 2024

(30) Foreign Application Priority Data
Jul. 29, 2022    (JP) .................................. 2022-121791

(51) Int. Cl.
*H04N 1/34* (2006.01)
*H04N 1/00* (2006.01)

(52) U.S. Cl.
CPC ......... *H04N 1/344* (2013.01); *H04N 1/00315* (2013.01); *H04N 1/00408* (2013.01); *H04N 1/00477* (2013.01)

(58) Field of Classification Search
CPC ............... H04N 1/344; H04N 1/00315; H04N 1/00408; H04N 1/00477; G06F 3/121; G06F 3/1229; G06F 3/1235
USPC ........................................................ 358/1.13
See application file for complete search history.

(56) References Cited

U.S. PATENT DOCUMENTS

| | | | |
|---|---|---|---|
| 2017/0063646 A1* | 3/2017 | Kawai | G06Q 10/10 |
| 2017/0090830 A1* | 3/2017 | Tomono | G06F 3/1235 |
| 2018/0041650 A1* | 2/2018 | Takahashi | H04N 1/00506 |
| 2020/0225885 A1 | 7/2020 | Akimoto et al. | |
| 2022/0100440 A1 | 3/2022 | Yamada | |
| 2023/0007141 A1* | 1/2023 | Tanaka | G06F 16/9554 |

FOREIGN PATENT DOCUMENTS

| | | |
|---|---|---|
| JP | 2020-111023 A | 7/2020 |
| JP | 2022-056970 A | 4/2022 |

* cited by examiner

*Primary Examiner* — Kent Yip
(74) *Attorney, Agent, or Firm* — Merchant & Gould P.C.

(57) ABSTRACT

A control device may be configured to detect that a communication state between a printer and a server which is configured to provide a service related to the printer has been changed from a communication-disabled state to a communication-enabled state and in a case where a change of the communication state from the communication-disabled state to the communication-enabled state is detected, display a notification message for promoting subscription to the service on a display unit.

12 Claims, 5 Drawing Sheets

CONTROL DEVICE, NON-TRANSITORY COMPUTER-READABLE RECORDING MEDIUM STORING COMPUTER-READABLE INSTRUCTIONS FOR CONTROL DEVICE, AND METHOD EXECUTED BY CONTROL DEVICE DISPLAYING SERVICE NOTIFICATION

REFERENCE TO RELATED APPLICATIONS

This application claims priority from Japanese Patent Application No. 2022-121791 filed on Jul. 29, 2022. The entire content of the priority application is incorporated herein by reference.

BACKGROUND ART

An automatic toner order system including an MFP, an information management server and a delivery management server is known. When a toner low occurs, the MFP displays information indicating that the toner low has occurred. Then, when a toner delivery contract is not made, the MFP displays a screen for promoting the toner delivery contract.

DESCRIPTION

The present disclosure provides a technique capable of notifying a user of subscription to a service related to a printer at an appropriate timing.

The disclosure herein discloses a control device. The control device may be configured to: detect that a communication state between a printer and a server which is configured to provide a service related to the printer has been changed from a communication-disabled state to a communication-enabled state; and in a case where a change of the communication state from the communication-disabled state to the communication-enabled state is detected, display a notification message for promoting subscription to the service on a display unit.

According to the above-described configuration, the control device displays the notification message on the display unit when it is detected that the communication state between the printer and the server has changed from the communication-disabled state to the communication-enabled state, that is, when a state of the printer has changed to a state in which the printer can receive the provision of the service. Therefore, it is possible to notify the user of subscription to the service at an appropriate timing.

A computer program for implementing the above control device and a computer-readable recording medium storing the computer program are also novel and useful. A method executed by the above control device is also novel and useful. A communication system comprising the above control device and the printer is also novel and useful.

Figure 1:
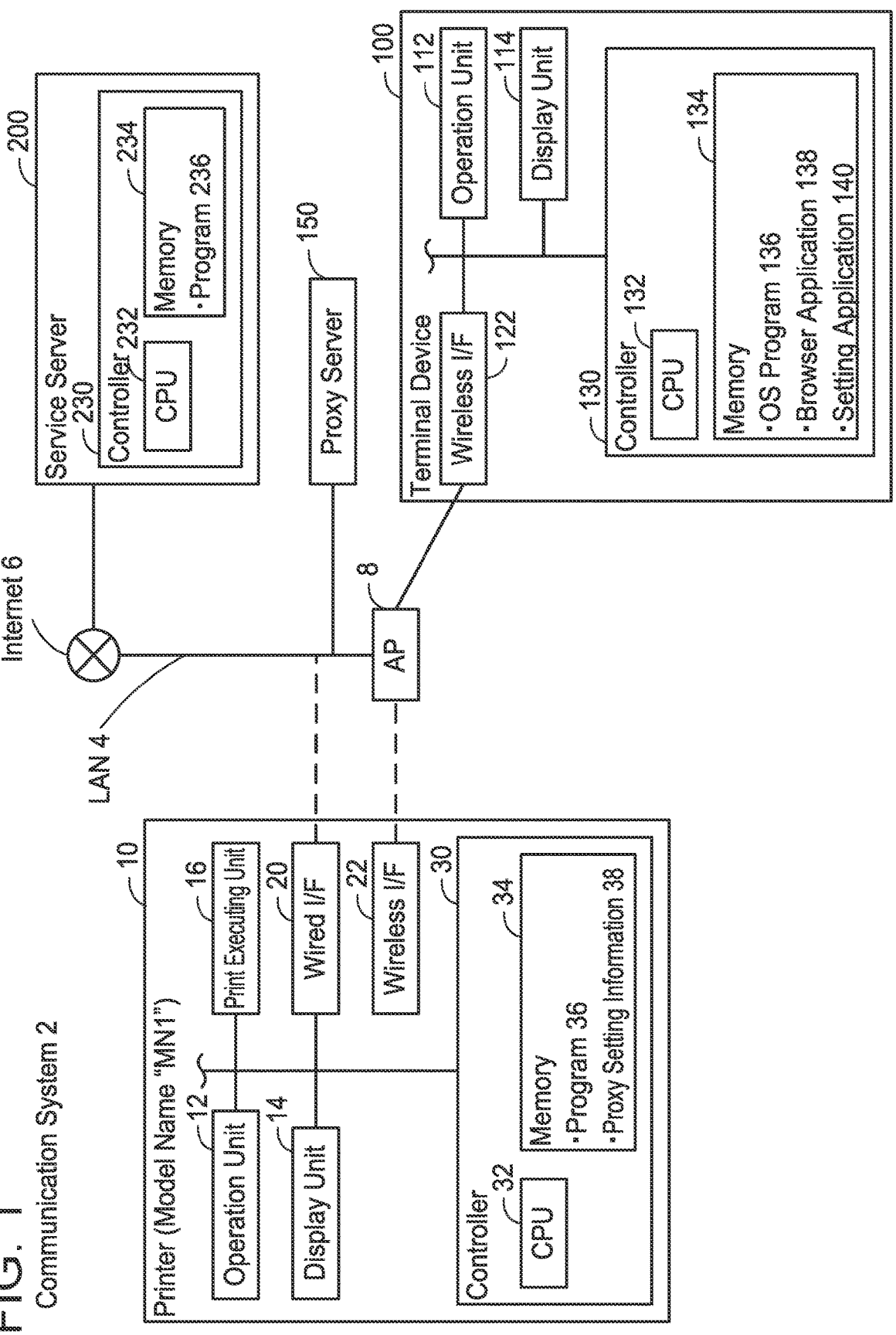
FIG. 1 illustrates a configuration of a communication system.

(Embodiment)
(Configuration of Communication System 2; FIG. 1)

As illustrated in FIG. 1, a communication system 2 includes a printer 10, a terminal device 100, a proxy server 150, a service server 200, and an access point 8. Hereinafter, the access point 8 will be referred to as "AP 8". The AP 8 is connected to a LAN 4. The service server 200 provides a service related to the printer 10. In the present embodiment, the service is a flat-rate print service (hereinafter, referred to as "flat-rate service").

(Configuration of Printer 10)

The printer 10 is a peripheral device (for example, a peripheral device of the terminal device 100) configured to execute a printing function. The printer 10 is further configured to execute a web server function. The web server function is a function of sending web page data corresponding to a web page to a terminal device (e.g., the terminal device 100) in response to the terminal device accessing the web server in the printer 10. The web page is, for example, a page for managing settings of the printer 10. In a modification, the printers 10 may be a multi-function device configured to execute a scan function, a facsimile function, and the like in addition to the printing and web server functions. The printer 10 includes a model name "MN1". The printer 10 includes an operation unit 12, a display unit 14, a print executing unit 16, a wired interface 20, a wireless interface 22, and a controller 30. Hereinafter, the interface is referred to as "I/F".

The operation unit 12 includes a plurality of keys. The user can input various instructions to the printer 10 by operating the operation unit 12. The display unit 14 is a display for displaying various types of information. The display unit 14 also functions as a so-called touch screen (i.e., an operation unit that accepts an operation from the user). The print executing unit 16 includes a printing mechanism of an inkjet scheme. The print executing unit 16 may include a printing mechanism of a laser scheme or the like. The wireless I/F 22 is a wireless I/F for executing wireless communication which conforms to a Wi-Fi standard.

The controller 30 includes a CPU 32 and a memory 34. The CPU 32 executes various processes in accordance with a program 36 stored in the memory 34. The memory 34 is configured of a volatile memory, a nonvolatile memory, and the like. The memory 34 stores proxy setting information 38. The proxy setting information 38 includes flag information indicating a value which is one of "enabled" indicating that the proxy server 150 is used and "disabled" indicating that the proxy server 150 is not used. The proxy setting information 38 may further include a plurality of pieces of setting information (e.g., a URL of the proxy server 150) for using the proxy server 150.

(Configuration of Terminal Device 100)

The terminal device 100 is a portable terminal device such as a mobile phone (e.g., a smart phone), a PDA, or a tablet PC. The terminal device 100 includes an operation unit 112, a display unit 114, a wireless I/F 122, and a controller 130.

The operation unit 112 comprises a plurality of keys. The user can input various instructions to the terminal device 100 by operating the operation unit 112. The display unit 114 is a display for displaying various types of information. The display unit 114 also functions as a touch screen (i.e., an operation unit) that accepts an instruction from the user. The wireless I/F 122 is a wireless I/F for executing wireless communication which conforms to a Wi-Fi standard.

The controller 130 includes a CPU 132 and a memory 134. The CPU 132 executes various processes according to programs 136, 138, and 140 stored in the memory 134. The memory 134 is configured of a volatile memory, a nonvolatile memory, and the like. The memory 134 stores the Operating System (OS) programs 136, the browser application 138, and the setting application 140. Hereinafter, the application is simply referred to as "app". The OS program 136 is a program for controlling the basic operation of the terminal device 100. The browser app 138 is a program for accessing a web server (for example, the service server 200) on the Internet 6 and browsing a web page. The browser app 138 is stored in advance in the terminal device 100 before shipment of the terminal device 100. The browser app 138 is a general-purpose web browser application such as Internet Explorer (registered trademark) or Microsoft Edge (registered trademark), and is generally provided by a software vendor other than a vendor of the printer 10. The setting app 140 is an application for changing the settings of the printer 10 by using the terminal device 100.

(Configuration of Service Server 200)

The service server 200 is installed on the Internet 6 by the vendor of the printer 10. In a modification, the service server 200 may be installed on the Internet 6 by a provider different from the vendor. In another modification, the vendor of the printer 10 may not prepare its own hardware of the service server 200 but may use an environment provided by an external cloud computing service. In this case, the vendor of the printer 10 may implement the service server 200 by preparing a program (i.e., software) of the service server 200 and introducing the program into the environment described above. The service server 200 provides a service (e.g., the flat-rate service) related to the printer 10. The flat-rate service is a service in which a user is charged with a predetermined amount of money when the number of print sheets printed in a predetermined period (e.g., one month) is equal to or less than the contractual number of printed sheets (e.g., 1000 sheets). The flat-rate service includes a service for automatically shipping a new dedicated cartridge when a remaining amount of a dedicated cartridge attached to the print executing unit 16 of the printer 10 becomes equal to or less than a predetermined remaining amount. In addition, when the user subscribes to the flat-rate service, the service server 200 ships the dedicated cartridge to the user. In a modification, the service server 200 may provide a pay-per-use printing service that is a service in which the user is charged with fees corresponding to the number of print sheets printed in a predetermined period (e.g., one month) instead of the flat-rate service. When a start request is received from the printer 10 after the user has started to subscribe to the flat-rate service, the service server 200 starts the provision of the flat-rate service.

The service server 200 includes a controller 230. The controller 230 includes a CPU 232 and memory 234. The CPU 232 executes various processes according to a program 236 stored in the memory 234. The memory 234 is configured of a volatile memory, a nonvolatile memory, and the like.

Figure 2:
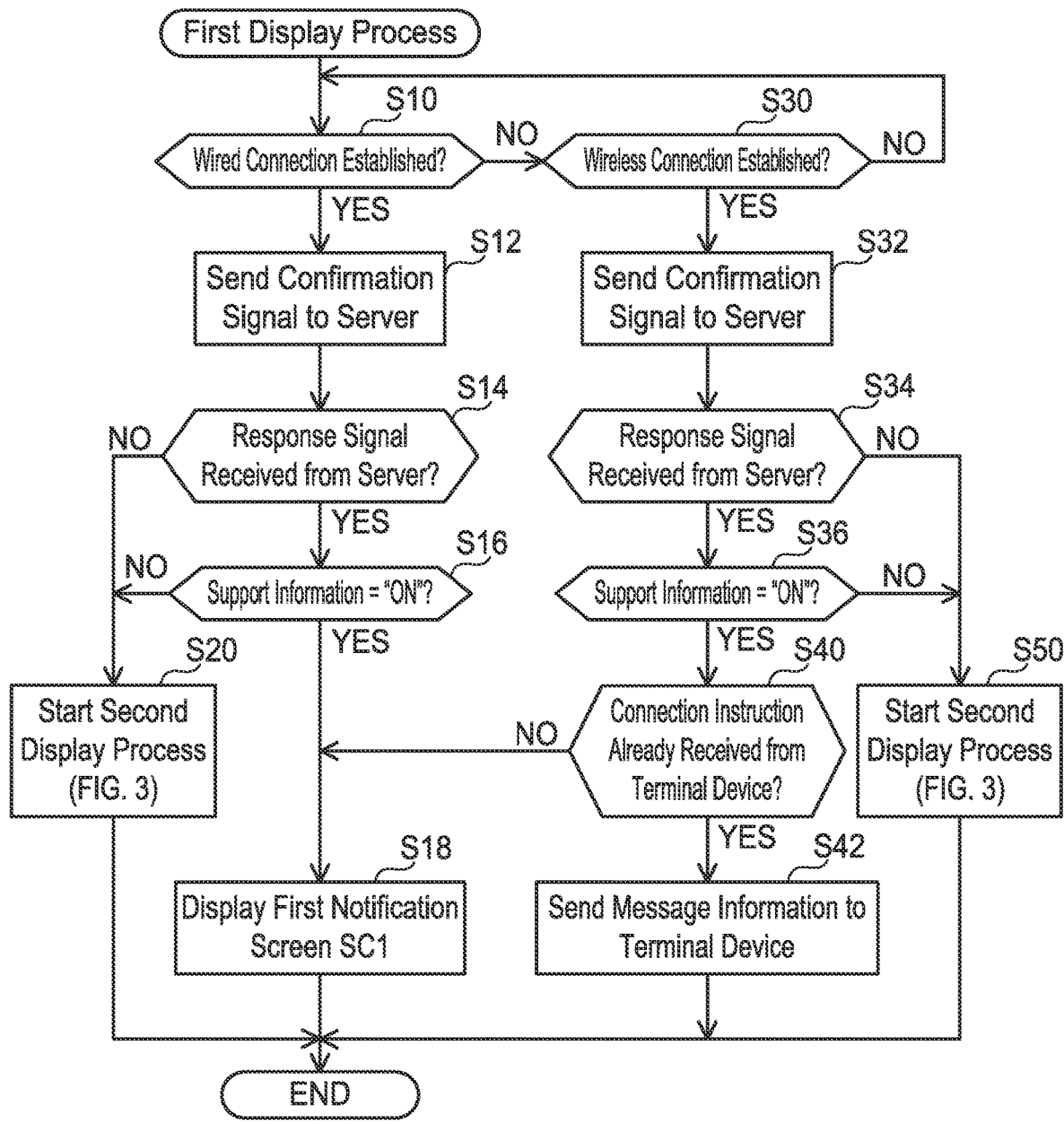
FIG. 2 illustrates a flowchart of a first display process.
Figure 2:
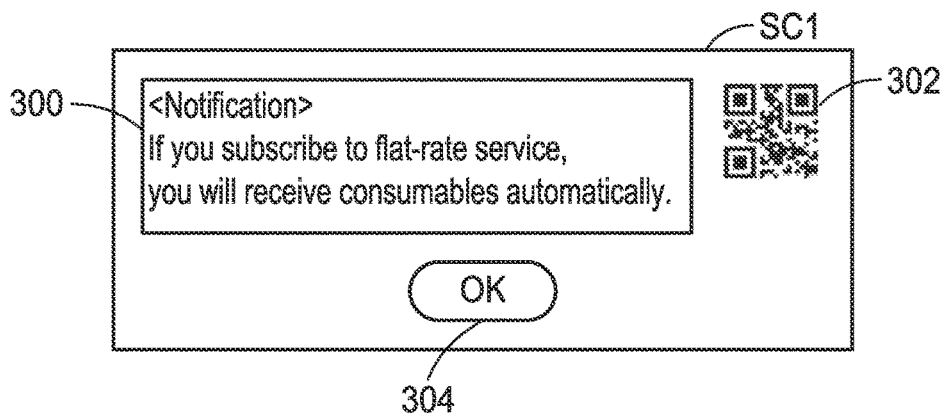

(First Display Process: FIG. 2)

With reference to FIG. 2, a first display process executed by the CPU 32 of the printer 10 will be described. The CPU 32 starts the process of FIG. 2 when the printer 10 is turned on.

In S10 of FIG. 2, the CPU 32 monitors establishment of a wired connection. Specifically, the CPU 32 monitors a cable being connected to the wired I/F 20 and a signal for assigning an IP address of the printer 10 being received from a DHCP server (not illustrated). When the wired connection is established, the CPU 32 determines YES in S10 and proceeds to S12.

In S12, the CPU 32 sends a confirmation signal including the model name "MN1" of the printer 10 to the service server 200 using the wired connection established in S10 via the wired I/F 20. The confirmation signal is a signal for checking whether a communication state between the printer 10 and the service server 200 (hereinafter simply referred to as "communication state") is a communication-enabled state. Further, the confirmation signal is a signal for requesting sending of support information indicating whether a model indicated by the model name in the signal (hereinafter, referred to as "target model") is a model that supports the flat-rate service (hereinafter, referred to as "support model"). The support information is one of "ON" indicating that the target model is the support model and "OFF" indicating that the target model is not the support model.

In S14, the CPU 32 determines whether a response signal including the support information is received from the service server 200 via the wired I/F 20. The CPU 32 proceeds to S16 when the response signal is received (YES in S14) while proceeds to S20 when no response signal is received (NO in S14). The CPU 32 detects that the communication state has been changed from the communication-disabled state to the communication-enabled state when the response signal is received from the service server 200 in response to the confirmation signal being sent to the service server 200. This ensures that the printer 10 detects whether the communication state has been changed from the communication-disabled state to the communication-enabled state.

In S16, the CPU 32 determines whether the support information included in the response signal received in S14 is "ON". The CPU 32 proceeds to S18 when the support information is "ON" (YES in S16). On the other hand, the CPU 32 proceeds to S20 when the support information is "OFF" (NO in S16).

In S18, the CPU 32 displays a first notification screen SC1 on the display unit 14. The first notification screen SC1 includes a notification message 300 prompting the user to subscribe to the flat-rate service, a QR Code (registered trademark) 302, and an OK button 304. The user can access the service server 200 and subscribe to the flat-rate service by capturing the QR code 302 on the first notification screen SC1 using a camera of a mobile terminal (not illustrated). When S18 ends, the CPU 32 ends the process of FIG. 2.

As described above, when the cable is connected to the wired I/F 20 (YES in S10), the printer 10 sends the confirmation signal to the service server 200. When the cable is connected to the wired I/F 20, it is highly likely that the communication state has been changed from the communication-disabled state to the communication-enabled state. Therefore, the notification message 300 can be displayed on the display unit 14 at an appropriate timing. Further, the printer 10 displays the notification message 300 on the display unit 14 when the cable is connected to the wired I/F 20 (YES in S10) and it is detected that the communication state has been changed from the communication-disabled state to the communication-enabled state (YES in S14). When the cable is connected to the wired I/F 20, the user is close to the printers 10. Therefore, it is possible to increase the possibility that the user views the notification message 300.

Further, as described above, when it is detected that the communication state has been changed from the communication-disabled state to the communication-enabled state and the printer 10 is the support model (YES in S16), the printer 10 displays the notification message 300 on the display unit 14 while when it is detected that the communication state has been changed from the communication-disabled state to the communication-enabled state and the printer 10 is not the support model (NO in S16), the printer 10 does not display the notification message 300 on the display unit 14. When the printer 10 is not the support model, the notification message 300 is not useful to the user. Therefore, it is possible to suppress display of information that is not useful to the user.

Figure 3:
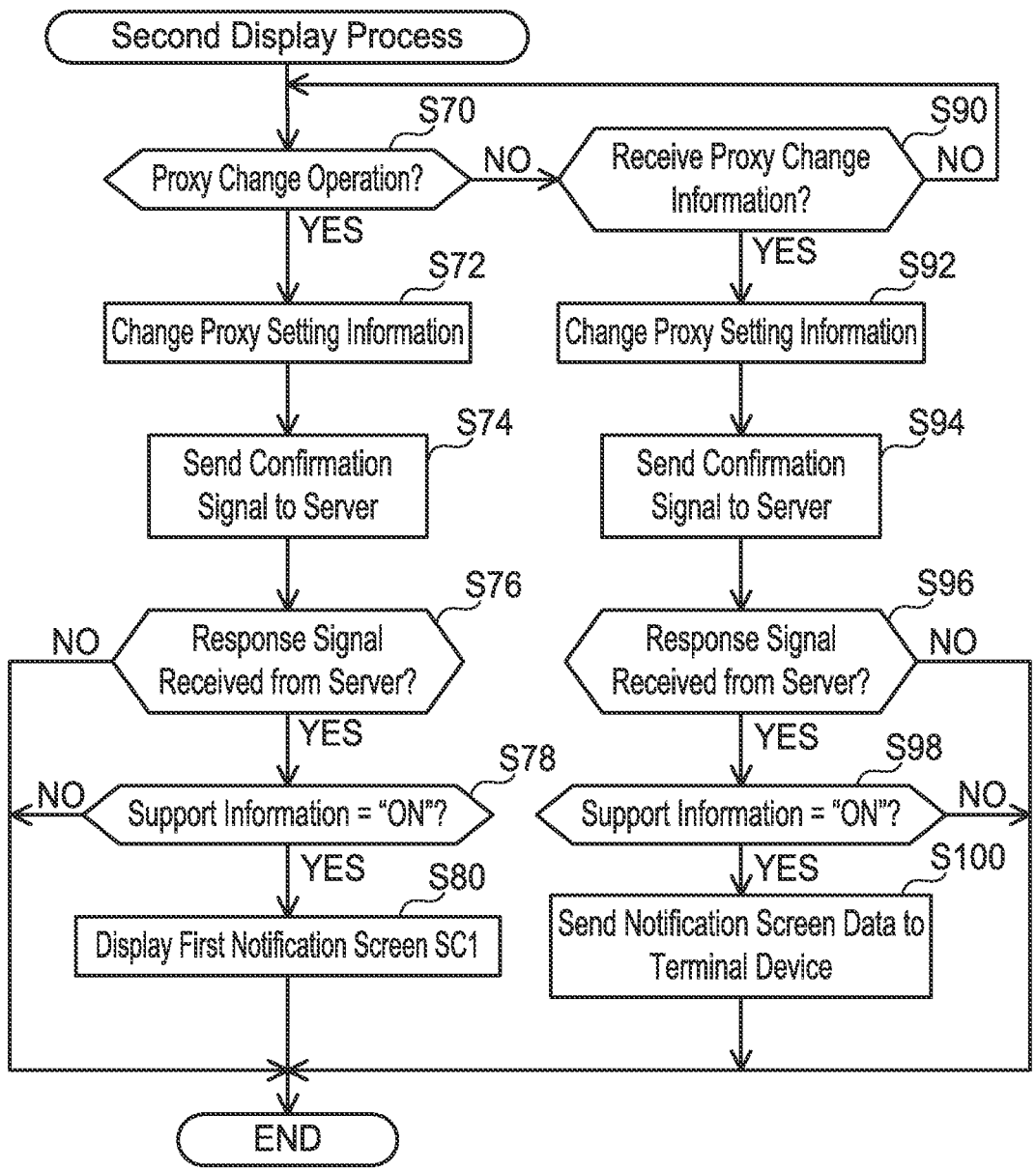
FIG. 3 illustrates a flowchart of a second display process.

In S20, the CPU 32 starts a second display process (FIG. 3). The second display process is a process in which the notification message 300 is displayed in response to a change in the proxy setting information 38. When S20 ends, the CPU 32 ends the process of FIG. 2.

The CPU 32 also monitors, at the same time as the monitoring of S10, establishment of a wireless connection in S30. Specifically, the CPU 32 monitors establishment of a wireless connection with the AP 8. When the wireless connection with the AP 8 is established, the CPU 32 determines YES in S30 and proceeds to S32. When the CPU 32 obtains a connection instruction for establishing a wireless connection with the AP 8 in response to the operation unit 12 being operated by the user and information for establishing a wireless connection with the AP 8 (hereinafter, referred to as "AP connection information") being inputted, the CPU 32 establishes a wireless connection with the AP 8 by using this AP connection information. Further, when the connection instruction including the AP connection information is obtained from the terminal device 100 (specifically, the setting app 140) via the wireless I/F 22 in response to the terminal device 100 being operated by the user, the CPU 32 establishes a wireless connection with the AP 8 by using this AP connection information. The communication between the printer 10 and the setting app 140 of the terminal device 100 is executed, for example, according to Wi-Fi Direct (registered trademark).

In S32, the CPU 32 sends the confirmation signal including the model name "MN1" of the printer 10 to the service server 200 using the wireless connection established in S30 via the wireless I/F 22 and the AP 8.

In S34, the CPU 32 determines whether a response signal including the support information is received from the service server 200 via the wireless I/F 22 and the AP 8. The CPU 32 proceeds to S36 when the response signal is received (YES in S34) while proceeds to S50 when no response signal is received (NO in S34). S36, S50 are the same as S16, S20, respectively.

In S40, the CPU 32 determines whether the connection instruction has already been received from the terminal device 100 via the wireless I/F 22. The CPU 32 proceeds to S42 when the connection instruction has already been received from the terminal device 100 via the wireless I/F 22 (YES in S40). On the other hand, the CPU 32 proceeds to S18 when the connection instruction has not been received from terminal device 100 via the wireless I/F22, that is, when the connection instruction is obtained in response to the operation unit 12 being operated by the user (NO in S40).

Figure 4:
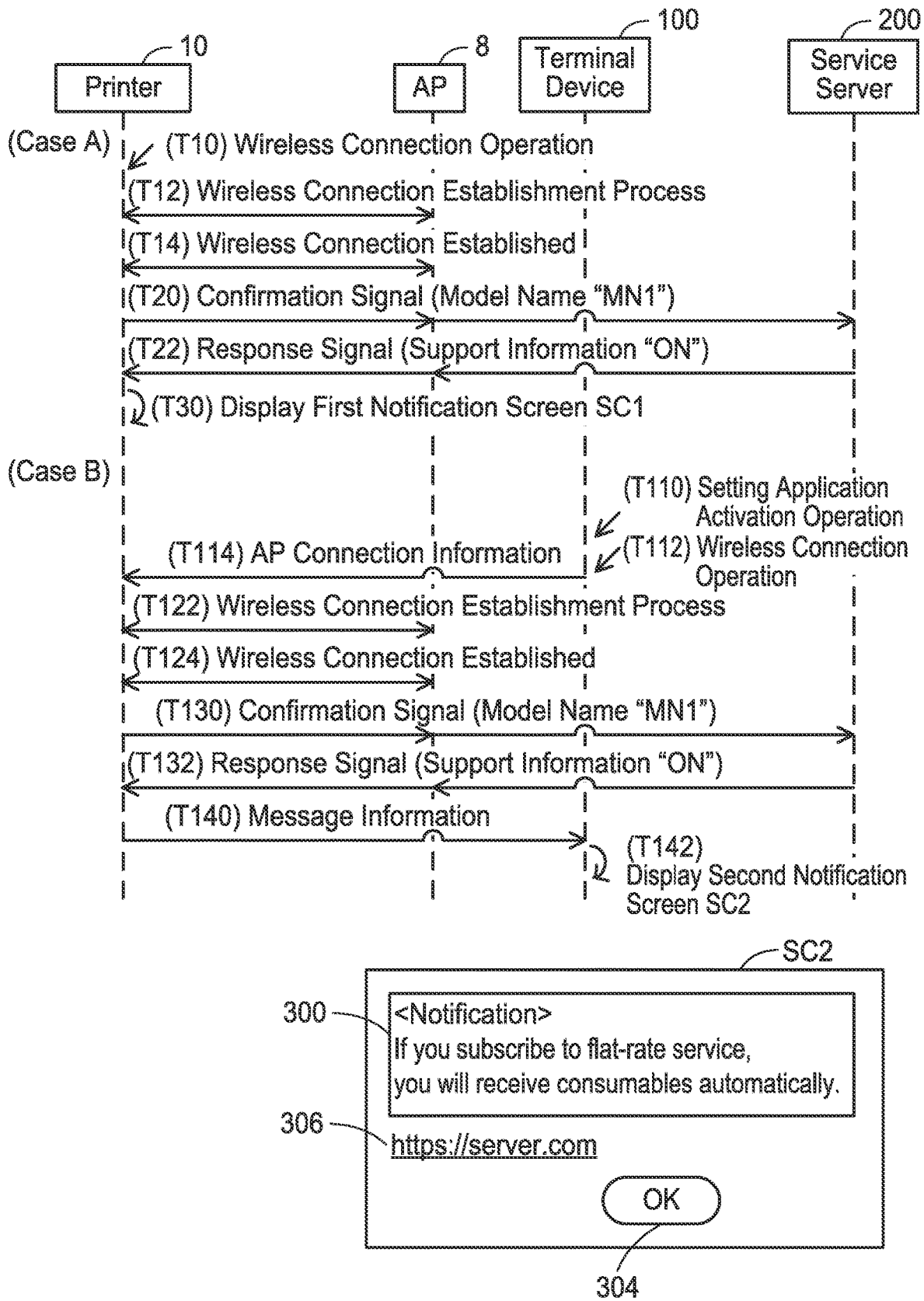
FIG. 4 illustrates sequences of Case A and Case B in which a notification screen is displayed.

In S42, the CPU 32 sends message information to the terminal device 100 (specifically, the setting app 140) via the wireless I/F 22. The message information is information related to the notification message 300 and is a signal for requesting display of the second notification screen SC2. When the setting app 140 of the terminal device 100 receives the message information from the printer 10 via the wireless I/F 122, the setting app 140 of the terminal device 100 displays the second notification screen SC2 including the notification message 300 on the display unit 114. As illustrated in FIG. 4, the second notification screen SC2 includes the notification message 300, an OK button 304, and link information 306 for accessing the service server 200. The user can access the service server 200 and subscribe to the flat-rate service by selecting the link information 306 on the second notification screen SC2. When S42 of FIG. 2 ends, the CPU 32 ends the process of FIG. 2.

As described above, the printer 10 sends the confirmation signal to the service server 200 when a wireless connection with the AP 8 is established (YES in S30). When the wireless connection with the AP 8 is established, it is highly likely that the communication state between the printer 10 and the service server 200 has been changed from the communication-disabled state to the communication-enabled state. Therefore, the notification message 300 can be displayed on the display unit 114 of the terminal device 100 at an appropriate timing.

(Second Display Process: FIG. 3)

With reference to FIG. 3, a second display process executed by the CPU 32 of the printer 10 will be described. The CPU 32 starts the process of FIG. 3 when NO is determined in S14, S16, S34 or S36 of FIG. 2. Communication between the printer 10 and the service server 200 in FIG. 3 is executed via the wired I/F 20 or via the wireless I/F 22 and the AP 8. In the explanation of FIG. 3, the phrase "via the wired I/F 20 or via the wireless I/F 22 and the AP 8" will be omitted.

In S70, the CPU 32 monitors acceptance of a proxy change operation on the operation unit 12. The proxy change operation is an operation for changing the proxy setting information 38 in the memory 34. When the CPU 32 accepts the proxy change operation, the CPU 32 determines YES in S70, and proceeds to S72. When the CPU 32 determines YES in S70, the CPU 32 determines that a change instruction for changing the proxy setting information 38 has been obtained.

In S72, the CPU 32 changes the proxy setting information 38 in the memory 34 in response to the proxy change operation of S70. S74 to S78 are the same as S12 to S16 or S32 to S36 of FIG. 2. S80 is the same as S18 of FIG. 2. When S80 ends, the CPU 32 ends the process of FIG. 3.

The CPU 32 also monitors receipt of proxy change information from the terminal device 100 in S90 at the same time as the monitoring of S70. The proxy change information is sent from the terminal device 100 by using the web server function of the printer 10. When the proxy change information is received, the CPU 32 determines YES in S90, and proceeds to S92. When the CPU 32 determines YES in S90, the CPU 32 determines that the change instruction for changing the proxy setting information 38 has been obtained.

In S92, the CPU 32 changes the proxy setting information 38 in the memory 34 using the proxy change information received in S90. S94 to S98 are the same as S12 to S16 or S32 to S36 of FIG. 2.

In S100, the CPU 32 sends notification screen data to the terminal device 100. The notification screen data is data representing the second notification screen SC2 (see FIG. 4). When S100 ends, the CPU 32 ends the process of FIG. 3.

In the present embodiment, when it is detected that the communication state has been changed from the communication-disabled state to the communication-enabled state for the first time since purchase of the printer 10, the CPU 32 displays a notification screen including the notification message 300 (that is, the first notification screen SC1 or the second notification screen SC2) on the display unit 14 of the printer 10 or the display unit 114 of the terminal device 100. That is, even when it is detected again that the communication state has been changed from the communication-disabled state to the communication-enabled state after the notification screen including notification message 300 is displayed on the display unit 14 of the printer 10 or the display unit 114 of the terminal device 100, the CPU 32 does not display the notification screen including the notification message 300 on the display unit 14 of the printer 10 or the display unit 114 of the terminal device 100. When the notification screen including the notification message 300 is displayed twice or more, this may bother the user. According to the above configuration, it is possible to suppress the user from being bothered.

As described above, when the change instruction is obtained (YES in S70 or YES in S90), the printer 10 sends the confirmation signal to the service server 200 (S74, S94). When the change instruction is obtained, it is highly likely that the communication state between the printer 10 and the service server 200 has been changed from the communication-disabled state to the communication-enabled state. Therefore, the notification message 300 can be displayed on the display unit 14 of the printer 10 or the display unit 114 of the terminal device 100 at an appropriate timing.

(Specific Cases A to D)

Figure 5:
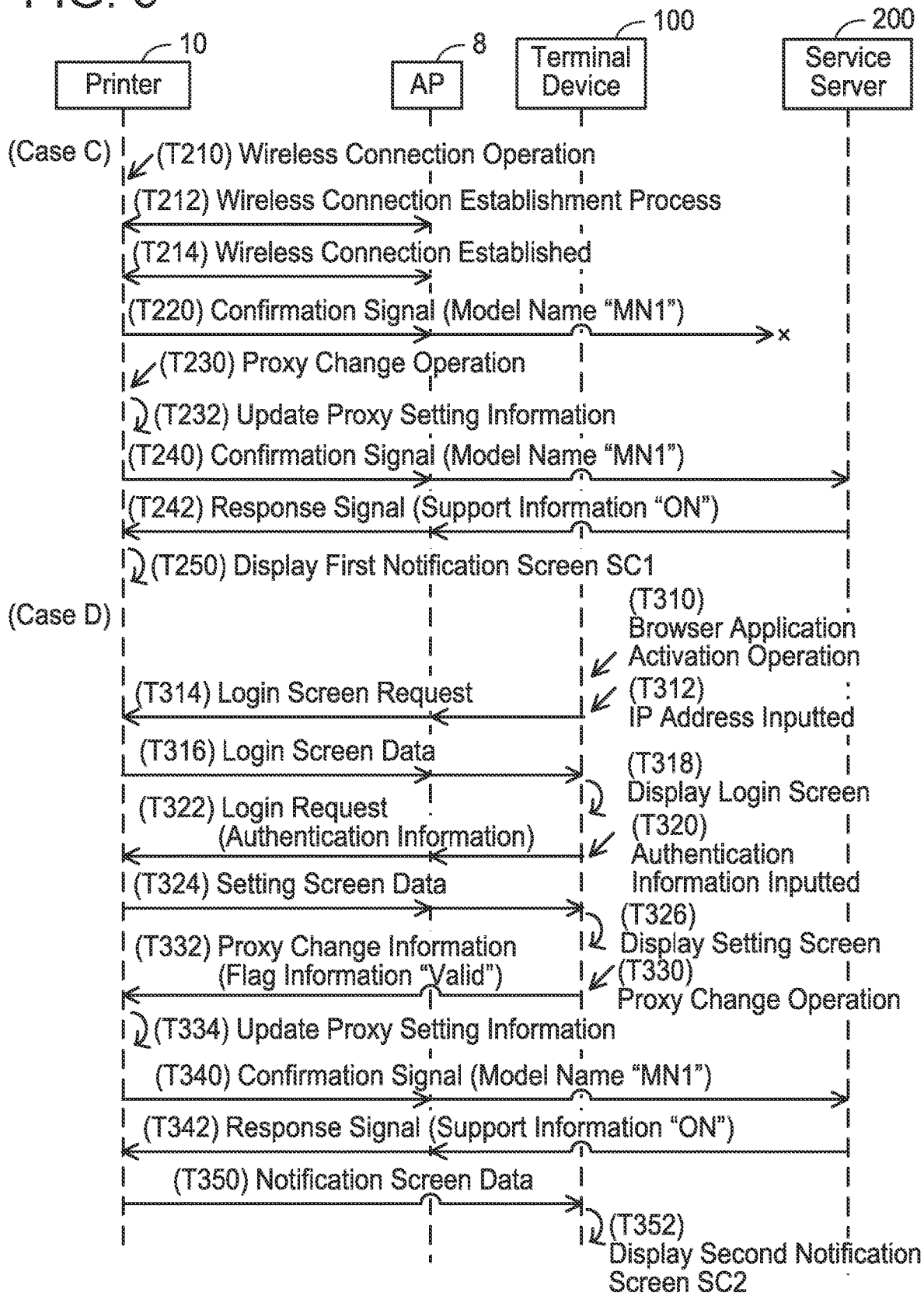
FIG. 5 illustrates sequences of Case C and Case D in which a notification screen is displayed.

With reference to FIGS. 4 and 5, specific cases A to D realized by the processes of FIGS. 2 and 3 will be described.

(Case A; FIG. 4)

With reference to FIG. 4, Case A in which a wireless connection between the printer 10 and the AP 8 is established in response to the operation unit 12 of the printer 10 being operated by the user will be described. In the initial state of Case A, "enabled" is stored in the proxy setting information 38 of the memory 34 of the printer 10 as the flag information indicating that the proxy server 150 is used, and a plurality of pieces of suitable setting information for using the proxy server 150 is stored. That is, the printer 10 can be connected to the Internet 6 when connected to the LAN 4.

In T10, the printer 10 accepts a wireless connection operation including input of the AP connection information. In this case, in T12, the printer 10 executes a wireless connection establishment process by using the inputted AP connection information. The wireless connection establishment process is a process for the printer 10 to establish a wireless connection with the AP 8 via the wireless I/F 22. When the wireless connection establishment process succeeds and the wireless connection with the AP 8 is established in T14, the printer 10 determines that the wireless connection has been established (YES in S30 of FIG. 2), and sends the confirmation signal including the model name "MN1" to the service server 200 via the wireless I/F 22 and the AP 8 in T20 (S32).

When the service server 200 receives the confirmation signal from the printer 10 via the AP 8 in T20, the service server 200 identifies the model name "MN1" in the signal, determines that the identified model name "MN1" is the support model, and sends the response signal including the support information "ON" to the printer 10 via the AP 8 in T22. When the identified model name "MN1" is not the support model, the service server 200 sends the response signal including the support information "OFF" to the printer 10.

In T22, when the printer 10 receives the response signal from the service server 200 via the wireless I/F 22 and the AP 8 (YES in S34), the printer 10 determines that the support information in this signal is "ON" (YES in S36), determines that the AP connection information has not been received from the terminal device 100 (NO in S40) and displays the first notification screen SC1 (see FIG. 2) in T30 (S42).

As described above, the printer 10 displays the notification message 300 on the display unit 14 when the connection instruction is obtained (T10) in response to the operation unit 12 of the printer 10 being operated by the user, the wireless connection with the AP 8 is established (T14), and it is detected that the communication state between the printer 10 and the service server 200 has been changed from the communication-disabled state to the communication-enabled state. When the operation unit 12 of the printer 10 is operated by the user, the user is looking at the display unit 14 of the printer 10. Therefore, it is possible to increase the possibility that the user views the notification message 300.

(Case B; FIG. 4)

With reference to FIG. 4, Case B in which a wireless connection between the printer and the AP 8 is established in response to the AP connection information being sent from the setting app 140 of the terminal device 100 to the printer 10 will be described. The initial state of case B is the same as the initial state of Case A.

When the terminal device 100 accepts an operation for activating the setting app 140 in T110, the terminal device 100 activates the setting app 140. Next, the setting app 140 of the terminal device 100 accepts a wireless connection operation for establishing a wireless connection between the printer 10 and the AP 8 in T112. The wireless connection operation includes input of the AP connection information. In T114, the setting app 140 of the terminal device 100 sends the inputted AP connection information to the printer 10 via the wireless I/F 122. The communication of T114 is executed without the AP 8.

When the printer 10 receives the AP connection information from the terminal device 100 via the wireless I/F 22 in T114, the printer 10 executes the wireless connection establishment process using the received AP connection information in T122. T124, T130, T132 are the same as T14, T20, T22 of Case A, respectively. When the printer 10 receives the response signal from the service server 200 via the wireless I/F 22 and the AP 8 in T132 (YES in S34), the printer 10 determines that the support information in this signal is "ON" (YES in S36), determines that the AP connection information has already been received from the terminal device 100 (YES in S40) and sends the message information to the terminal device 100 via the wireless I/F 22 in T140 (S42).

When the setting app 140 of the terminal device 100 receives the message information from the printer 10 via the wireless I/F 122 in T140, the setting app 140 of the terminal device 100 displays the second notification screen SC2 stored in the memory of the setting app 140 in T142.

As described above, the printer 10 causes the display unit 114 of the terminal device 100 to display the notification message 300 when the connection instruction is obtained from the terminal device 100 (T114) in response to the terminal device 100 being operated by the user (T112), a wireless connection with the AP 8 is established (T124), and it is detected that the communication state between the printer 10 and the service server 200 has been changed from the communication-disabled state to the communication-enabled state. When the terminal device 100 is operated by the user, the user is looking at the display unit 114 of the terminal device 100. Therefore, it is possible to increase the possibility that the user views the notification message 300.

(Case C; FIG. 5)

With reference to FIG. 5, Case C in which the proxy setting information 38 of the memory 34 of the printer 10 is changed in response to the operation unit 12 of the printer 10 being operated by the user will be described. In the initial state of Case C, the flag information "disabled" indicating the proxy server 150 is not used is stored in the proxy setting information 38 of the memory 34 of the printer 10, and a plurality of pieces of suitable setting information for using the proxy server 150 is stored. That is, the printer 10 cannot be connected to the Internet 6 even when it is connected to the LAN 4.

T210 to T220 are the same as T10 to T20 of Case A of FIG. 4. In the present case, since the flag information in the proxy setting information 38 is set to "disabled", the printer 10 cannot use the proxy server 150. Therefore, even when a wireless connection is established between the printer 10 and the AP 8, the confirmation signal is not sent to the service server 200. In this case, the printer 10 determines that the response signal is not received (NO in S14 of FIG. 2) and starts the second display process (FIG. 3) (S20).

In T230, the printer 10 accepts a proxy change operation for changing the proxy setting information 38 (YES in S70 of FIG. 3). The proxy change operation of the present case includes an operation for changing the flag information of the proxy setting information 38 from "disabled" to "enabled". In this case, the printer 10 updates the proxy setting information 38 in T232. Specifically, the printer 10 changes the flag information of the proxy setting information 38 from "disabled" to "enabled" (S72). Next, the printer 10 sends the confirmation signal including the model name "MN1" to the service server 200 in T240. Since the flag information in the proxy setting information 38 is set to "enabled", the printer 10 can use the proxy server 150. Therefore, the confirmation signal is sent to the service server 200 via the AP 8. T242 is the same as T22 of Case A of FIG. 4.

When the printer 10 receives the response signal from the service server 200 via the wireless I/F 22 and the AP 8 in T242 (YES in S76), the printer 10 determines that the support information in the signal is "ON" (YES in S78) and displays the first notification screen SC1 (see FIG. 2) in T250 (S80).

(Case D; FIG. 5)

With reference to FIG. 5, Case D in which the proxy setting information 38 in the memory 34 of the printer 10 is changed by using the web server function of the printer 10 will be described. The initial state of Case D is the state after T220 of Case C.

When the terminal device 100 accepts an operation for activating the browser app 138 in T310, the terminal device 100 activates the browser app 138. Next, when the browser app 138 of the terminal device 100 accepts input of the IP address of the printer 10 in T312, the browser app 138 sends a login screen request to the printer 10 via the wireless I/F 122 and the AP 8 in T314, receives login screen data from the printer 10 via the wireless I/F 122 and the AP 8 in T316 and displays the login screen in T318. Next, when the browser app 138 of the terminal device 100 accepts input of authentication information in T320, the browser app 138 sends a login request including the inputted authentication information to the printer 10 via the wireless I/F 122 and the AP 8 in T322.

When the printer 10 receives the login request from the terminal device 100 via the wireless I/F 22 and the AP 8 in T322, the printer 10 executes authentication by using the authentication information in the request. When the authentication succeeds, the printer 10 sends setting screen data to the terminal device 100 via the wireless I/F 22 and the AP 8 in T324. The setting screen data is data representing a setting screen for changing various settings of the printer 10.

When the browser app 138 of the terminal device 100 receives the setting screen data from the printer 10 via the wireless I/F 122 and the AP 8 in T324, the browser app 138 displays the setting screen in T326 and accepts a proxy change operation for changing the proxy setting information 38 of the printer 10 in T330. The proxy change operation in the present case includes an operation for changing the flag information of the proxy setting information 38 from "disabled" to "enabled". In this case, the browser app 138 of the terminal device 100 sends the proxy change information including the flag information "enabled" to the printer 10 via the wireless I/F 122 and the AP 8 in T332.

When the printer 10 receives the proxy change information from the terminal device 100 via the wireless I/F 22 and the AP 8 in T332 (YES in S90 of FIG. 3), the printer 10 updates the proxy setting information 38 in T334 (S92). T340, T342 are the same as T240, T242 of Case C, respectively. When the printer 10 receives the response signal from the service server 200 via the wireless I/F 22 and the AP 8 in T342 (YES in S96), the printer 10 determines that the support information in the signal is "ON" (YES in S98), and sends the notification screen data to the terminal device 100 via the wireless I/F 22 and the AP 8 in T350 (S100).

When the browser app 138 of the terminal device 100 receives the notification screen data from the printer 10 via the wireless I/F 122 and the AP 8 in T350, the printer 10 displays the second notification screen SC2 represented by the notification screen data in T352.

(Effect of Present Embodiment)

According to the above configuration, when it is detected that the communication state between the printer 10 and the service server 200 has been changed from the communication-disabled state to the communication-enabled state (YES in S14 of FIG. 2, YES in S34 of FIG. 2, YES in S76 of FIG. 3, or YES in S96 of FIG. 3), that is, when a state of the printer 10 changes to a state in which the printer 10 can receive the provision of the flat-rate service, the printer 10 displays the notification message 300 (S18 of FIG. 2, S80 of FIG. 3, T142 of FIG. 4, and T352 of FIG. 5). Therefore, it is possible to notify the user of the subscription to the service at an appropriate timing.

As described above, in order for the printer 10 to receive the provision of the flat-rate service after the user has subscribed to the flat-rate service, the start request needs to be sent from the printer 10 to the service server 200. When the communication state is the communication-disabled state, the printer 10 cannot send the start request to the service server 200. That is, when the communication state is the communication-disabled state, the printer 10 is unable to receive the provision of the flat-rate service. In this case, a situation occurs in which the printer 10 cannot receive the provision of the flat-rate service even when the user subscribes to the flat-rate service. When the communication state is changed from the communication-disabled state to the communication-enabled state, a state of the printer 10 is changed from a state in which the printer 10 cannot receive the provision of the flat-rate service to a state in which the printer 10 can receive the provision of the flat-rate service. Therefore, in the present embodiment, when it is detected that the communication state has been changed from the communication-disabled state to the communication-enabled state (YES in S14 of FIG. 2, YES in S34 of FIG. 2, YES in S76 of FIG. 3, or YES in S96 of FIG. 3), the printer 10 displays the notification message 300 (S18 of FIG. 2, S80 of FIG. 3, T142 of FIG. 4, T352 of FIG. 5). Therefore, the notification message 300 can be displayed under the state where the printer 10 can receive the provision of the flat-rate service. Therefore, user convenience can be enhanced.

(Corresponding Relationships)

The flat-rate service is an example of "service". The controller 30 of the printer 10 is an example of "control device". S10 of FIG. 2, S30 of FIG. 2, S70 of FIG. 3, and S90 of FIG. 3 are examples of "predetermined condition". The support model is an example of "predetermined model".

S14 of FIG. 2, S34 of FIG. 2, S76 of FIG. 3, and S96 of FIG. 3 are examples of "detect that a communication state between a printer and a server which is configured to provide a service related to the printer has been changed from a communication-disabled state to a communication-enabled state". S18 of FIG. 2, S42 of FIG. 2, S80 of FIG. 3, S100 of FIG. 3, T142 of FIG. 4, and T352 of FIG. 5 are examples of "display a notification message for promoting subscription to the service on a display unit".

(First Modification) The controller 230 of the service server 200 may be an example of "control device". In the present modification, when the confirmation signal is received from the printer 10, the service server 200 detects that the communication state has been changed from the communication-disabled state to the communication-enabled state, and displays the notification message 300 on the display unit 14 of the printer 10 or the display unit 114 of the terminal device 100.

(Second Modification) The controller 130 of the terminal device 100 may be an example of "control device". In the present modification, when information indicating that the printer 10 has received the response signal from the service server 200 is received from the printer 10, the terminal device 100 detects that the communication state has been changed from the communication-disabled state to the communication-enabled state, and displays the notification message 300 on the display unit 14 of the printer 10 or the display unit 114 of the terminal device 100.

(Third Modification) In an environment where the wired I/F 20 of the printer 10 is unlikely to be used, S10 to S18 of FIG. 2 may be omitted.

(Fourth Modification) The CPU 32 may send, to the terminal device 100, information for causing the display unit 114 of the terminal device 100 to display the second notification screen SC2 instead of displaying the first notification screen SC1 on the display unit 14 in S18 after YES in S16 of FIG. 2. In another modification, the CPU 32 may send, to the terminal device 100, information for causing the display unit 114 of the terminal device 100 to display the second notification screen SC2 in S18 at the same time as displaying the first notification screen SC1 on the display unit 14.

(Fifth Modification) In an environment where the wireless I/F 22 of the printer 10 is unlikely to be used, S30 to S42 of FIG. 2 may be omitted. In the present modification, "establish a wireless connection with an access point", "obtain the connection instruction", and "obtain the connection instruction from the terminal device" may be omitted.

(Sixth Modification) S40 of FIG. 2 may be omitted. In the present modification, the CPU 32 executes at least one of the processes of S18 and S42 when YES is determined in S36.

(Seventh modification) In an environment in which changing the settings of the proxy setting information 38 of the memory 34 of the printer 10 is prohibited, S20, S50 of FIG. 2 and the second display process of FIG. 3 may be omitted. In the present modification, "obtain a change instruction for changing the proxy setting information in the memory" may be omitted.

(Eighth Modification) The CPU 32 may display the notification screen including the notification message 300 on the display unit 14 of the printer 10 or the display unit 114 of the terminal device 100 when it is detected again that the communication state has been changed from the communication-disabled state to the communication-enabled state after the notification screen including the notification message 300 is displayed on the display unit 14 of the printer 10 or the display unit 114 of the terminal device 100. Specifically, the CPU 32 executes the first display process of FIG. 2 and the second display process of FIG. 3 after the notification screen including the notification message 300 is displayed on the display unit 14 of the printer 10 or the display unit 114 of the terminal device 100 as well.

(Ninth modification) S16 of FIG. 2, S36 of FIG. 2, S78 of FIG. 3, and S98 of FIG. 3 may be omitted. In the present modification, "determine whether a model of the printer is a predetermined model" may be omitted.

(Tenth Modification) In the above embodiment, the processes of FIGS. 2 to 5 are implemented by the CPU 32 executing the program 36. Instead of this, at least one of the processes of FIGS. 2 to 5 may be implemented by hardware such as a logic circuit.

What is claimed is:

1. A control device configured to:
   detect that a communication state between a printer and a server which is configured to provide a service related to the printer has been changed from a communication-disabled state to a communication-enabled state;
   determine whether a model of the printer is a predetermined model;
   in a case where (1) a change of the communication state from the communication-disabled state in which the service is not provided to the communication-enabled state is detected in which the service is available to be provided and (2) where it is determined that the model of the printer is the predetermined model, display a notification message for promoting subscription to the service on a display; and
   in a case where (1) the change of the communication state from the communication-disabled state to the communication-enabled state is detected and (2) it is determined that the model of the printer is not the predetermined model, the notification message is not displayed on the display.

2. The control device according to claim 1, wherein the control device is a controller of the printer, and the controller is configured to:
   in a case where a predetermined condition is satisfied, send a confirmation signal to the server; and
   in a case where a response signal is received from the server in response to the confirmation signal being sent to the server, detect that the communication state has been changed from the communication-disabled state to the communication-enabled state.

3. The control device according to claim 2, wherein in a case where a cable is connected to a wired interface of the printer, the predetermined condition is satisfied.

4. The control device according to claim 3, wherein the controller is configured to, in the case where the change of the communication state from the communication-disabled state to the communication-enabled state is detected, display the notification message on the display of the printer.

5. The control device according to claim 2, wherein the controller is further configured to:
   in a case where a connection instruction is obtained, establish a wireless connection with an access point, wherein in a case where the wireless connection is established, the predetermined condition is satisfied.

6. The control device according to claim 5, wherein the controller is further configured to:
   in response to an operation unit of the printer being operated by a user, obtain the connection instruction, and
   the controller is configured to, in the case where the change of the communication state from the communication-disabled state to the communication-enabled state is detected, display the notification message on the display of the printer.

7. The control device according to claim 5, wherein the controller is further configured to:
   in response to a terminal device being operated by a user, obtain the connection instruction from the terminal device, and
   the controller is configured to, in the case where the change of the communication state from the communication-disabled state to the communication-enabled state is detected, send message information related to the notification message to the terminal device so as to cause the display of the terminal device to display the notification message.

8. The control device according to claim 2, further comprising a memory configured to store proxy setting information,
   wherein the controller is further configured to:
   obtain a change instruction for changing the proxy setting information in the memory,
   wherein in a case where the change instruction is obtained, the predetermined condition is satisfied.

9. The control device according to claim 1, wherein
   in a case where the change of the communication state from the communication-disabled state to the communication-enabled state is detected for a first time since purchase of the printer, the notification message is displayed on the display, and
   in a case where the change of the communication state from the communication-disabled state to the communication-enabled state is detected again after the notification message has been displayed on the display, the notification message is not displayed on the display.

10. The control device according to claim 1, wherein
    in the case where the change of the communication state from the communication-disabled state to the communication-enabled state is detected, a display instruction for displaying the notification message is sent to an external device different from a device comprising the control device so as to cause the display of the external device to display the notification message.

11. A non-transitory computer-readable recording medium storing computer-readable instructions for a control device:
    wherein the computer-readable instructions, when executed by the control device, cause the control device to:
    detect that a communication state between a printer and a server which is configured to provide a service related to the printer has been changed from a communication-disabled state to a communication-enabled state;
    determine whether a model of the printer is a predetermined model; and
    in a case where (1) a change of the communication state from the communication-disabled state in which the service is not provided to the communication-enabled state is detected in which the service is available to be provided and (2) where it is determined that the model of the printer is the predetermined model, display a notification message for promoting subscription to the service on a display; and
    in a case where (1) the change of the communication state from the communication-disabled state to the communication-enabled state is detected and (2) it is determined that the model of the printer is not the predetermined model, the notification message is not displayed on the display.

12. A method executed by a control device, the method comprising:
    detecting that a communication state between a printer and a server which is configured to provide a service related to the printer has been changed from a communication-disabled state to a communication-enabled state;
    determining whether a model of the printer is a predetermined model; and
    in a case where (1) a change of the communication state from the communication-disabled state in which the service is not provided to the communication-enabled state is detected in which the service is available to be provided and (2) where it is determined that the model of the printer is the predetermined model, displaying a notification message for promoting subscription to the service on a display.

* * * * *